US008830937B2

(12) United States Patent
Monzat de Saint Julien et al.

(10) Patent No.: US 8,830,937 B2
(45) Date of Patent: Sep. 9, 2014

(54) METHOD FOR MULTIPLE ACCESS TO THE RADIO RESOURCES IN A MOBILE AD HOC NETWORK AND SYSTEM IMPLEMENTING THE METHOD

(75) Inventors: Gilles Monzat de Saint Julien, Ville (FR); Patrice Carrere, Levallois-Perret (FR)

(73) Assignee: Thales, Neuilly sur Seine (FR)

( * ) Notice: Subject to any disclaimer, the term of this patent is extended or adjusted under 35 U.S.C. 154(b) by 199 days.

(21) Appl. No.: 13/388,243

(22) PCT Filed: Jul. 30, 2010

(86) PCT No.: PCT/EP2010/061097
§ 371 (c)(1),
(2), (4) Date: Mar. 16, 2012

(87) PCT Pub. No.: WO2011/012694
PCT Pub. Date: Feb. 3, 2011

(65) Prior Publication Data
US 2012/0195230 A1 Aug. 2, 2012

(30) Foreign Application Priority Data
Jul. 31, 2009 (FR) ...................................... 09 03794

(51) Int. Cl.
 H04W 4/00 (2009.01)
 H04W 72/04 (2009.01)
 H04W 52/08 (2009.01)
 H04W 84/18 (2009.01)

(52) U.S. Cl.
CPC .......... *H04W 72/0453* (2013.01); *H04W 52/08* (2013.01); *H04W 72/0466* (2013.01); *H04W 84/18* (2013.01)
USPC ........................................................ 370/329

(58) Field of Classification Search
USPC .......... 370/328–339; 375/130–137; 445/13.4, 445/436–444, 522
See application file for complete search history.

(56) References Cited

U.S. PATENT DOCUMENTS

| 6,018,528 | A  | * | 1/2000 | Gitlin et al. ..................... 370/436 |
| 6,650,655 | B2 | * | 11/2003 | Alvesalo et al. ............... 370/468 |
| 2002/0176385 | A1 | | 11/2002 | Huh et al. |
| 2006/0234717 | A1 | | 10/2006 | Pun |

FOREIGN PATENT DOCUMENTS

WO 2007/092931 A2 8/2007

OTHER PUBLICATIONS

Agarwal S. et al.: "Distributed Power Control in Ad-Hoc Wireless Networks," Sep. 30, 2001, IEEE International Symposium on Personal, Indoor and Mobileradio Communications, pp. F-59 to F-66.

* cited by examiner

*Primary Examiner* — Frank Duong
(74) *Attorney, Agent, or Firm* — Baker & Hostetler LLP (57) ABSTRACT

Method for multiple access to the radio resources in a mobile ad hoc network comprising a plurality of communicating mobile terminals or nodes, having known geographical coordinates, including constructing the said network, allocating reception frequency bands to each of the said active nodes of the said network, the said frequency bands being of identical width and spaced apart by a given minimum guard band, spreading code allocation performed by each of the said receiver active nodes of the said network for each of the said neighbor transmitter nodes to which it is directly linked by an active link according to an asynchronous CDMA method, and power control performed by each of the said receiver nodes of the said network for each of the said neighbor transmitter nodes to which it is directly linked by an active link.

17 Claims, 3 Drawing Sheets

FIG.7

METHOD FOR MULTIPLE ACCESS TO THE RADIO RESOURCES IN A MOBILE AD HOC NETWORK AND SYSTEM IMPLEMENTING THE METHOD

CROSS-REFERENCE TO RELATED APPLICATIONS

This application is a National Stage of International patent application PCT/EP2010/061097, filed on Jul. 30, 2010, which claims priority to foreign French patent application No. FR 09 03794, filed on Jul. 31, 2009, the disclosures of each of which are incorporated by reference in their entireties.

FIELD OF THE DISCLOSED SUBJECT MATTER

The present invention relates to a method for multiple access to the radio resources in a mobile ad hoc network, for example a high-throughput low-latency network, as well as to the system implementing this method.

It advantageously applies in an aeronautical context where the nodes of the ad hoc network are aircraft but may be implemented for any type of mobile ad hoc network. The expression ad hoc network is understood to mean a network consisting of mobile elements, also called nodes, which at one and the same time combine the transmitter, receiver and relay functions. Each node of an ad hoc network communicates directly with its neighbors without passing through an intermediate access point which would have the function of relaying or/and routing the packets transmitted as is the case in a so-called infrastructure mode network. An ad hoc network offers a topology of meshed type. In the subsequent description, any mobile terminal communicating through a wireless link with other mobile terminals organized and structured within a meshed network will be called a network node. A node is for example, but not solely, an aircraft, or a pilotless plane which carries onboard a telecommunications system implementing the radio resources access method according to the invention.

By way of example, an infrastructure-mode network is a mobile telephone network of UMTS ("Universal Mobile Telecommunications System") type. This type of network consists on the one hand of mobile terminals which have a transmitter and receiver function, and on the other hand of fixed access points which have a function of relaying the messages from one cell to another. An ad hoc network, conversely, consists only of mobile nodes and does not require the implementation of fixed infrastructures to execute the functionality for routing the information transmitted.

One of the problems encountered in implementing a system for transmitting data within an ad hoc mobile network is that of the effective sharing of the spectral resources with the aim of offering fast access to the communication medium to all users, for high-throughput or discreet communications.

The prior art describes several multiple access methods which allow several terminals connected to the same transmission medium to share the available passband without interfering with one another.

A first existing multiple access method is the Time Division Multiple Access or TDMA method. This method allows all the users to communicate on one and the same given frequency by allocating them time segments during which they can transmit (respectively receive) data. This method is notably used in the GSM ("Global System for Mobile communications") European cellular telephony system. A drawback of the TDMA multiple access method is that the access time to the medium for a user is constrained to wait for a time segment which has been allocated to this user. This transmission lag then brings about a potentially appreciable latency time. A second drawback of this access method is that a guard time must be introduced between each time segment to take account of the signal propagation time, so as to prevent two distinct users from interfering with one another. The guard time is dimensioned as a function of the maximum distances between the users. The introduction of a guard time then brings about a decrease in the available passband.

A second known multiple access method is the Frequency Division Multiple Access or FDMA method. This method makes it possible to share a frequency span among several users by allocating each user one or more frequency bands in which he is authorized to communicate. A drawback of the FDMA multiple access method is that a guard band must be introduced between each frequency band so as to prevent two distinct users from interfering with one another. The size of the guard bands is dimensioned as a function of the performance of the bandpass filters and of the maximum relative speed between users (Doppler effect). The introduction of guard bands also brings about a decrease in the available passband.

A third multiple access method is the Code Division Multiple Access or CDMA method. This method is based on the known direct-sequence spread spectrum techniques. This method allows all the users to communicate on one and the same given frequency by allocating them orthogonal codes used to spread and despread the useful signal. However, the CDMA access method exhibits a limitation within the framework of a mobile ad hoc network. It is sensitive to the known problem of the "near-far effect". This problem occurs when a terminal transmits with high power towards a far distant terminal, this signal then saturating the nearer terminals.

Synchronous CDMA, which uses perfectly orthogonal codes (for example Walsh codes), is distinguished from asynchronous CDMA, which uses codes based on PN ("Pseudo Noise") sequences and known as PN codes (for example Gold or Kasami codes).

Another problem raised when one seeks to deploy a mobile ad hoc network is the specification of the type of antennas used. In order to guarantee a link with very high throughput, that is to say of the order of 100 Mbits/s, between two terminals of the network, and to do so with a maximum range, it is preferable to use directional antennas since they exhibit a more appreciable directivity gain in a given direction, thus making it possible to concentrate the whole of the transmission power towards the receiver terminal.

Finally, in a mobile network, the nodes move in the course of time, thus posing the problem of the dynamic reallocation of the radio resources by the access method. The method must notably be capable of taking account, as effectively as possible, of frequent changes of topology so as to cover the communication requirements of the nodes.

SUMMARY

The present invention proposes notably a multiple access method tailored to the effective sharing of resources within a mobile ad hoc network. Each platform is allocated a frequency band that it manages through a CDMA access method so as to simultaneously receive the signals arising from other platforms. When transmitting, each platform uses a code allocated by the addressee to transmit in the latter's frequency band.

The proposed access method differs from the TDMA or TDD ("Time Division Duplexing") access methods in the sense that it does not introduce any latency time related to waiting for a radio resource in order to transmit.

The access method according to the invention makes it possible to limit the drawbacks related to several prior art access methods.

The use of spreading codes according to a CDMA method makes it possible to limit the loss due to the guard bands required for a prior art FDMA method. Indeed, the method according to the invention makes it possible to multiplex several links within each band thus limiting the number of necessary bands.

The use of distinct reception frequency bands allocated to each node of the network makes it possible to limit the problem of the "near-far effect" introduced by the CDMA access methods. Indeed, by separating the transmissions so that in a given band it has only a single receiver, the problem of the "near-far effect" is avoided by design.

The proposed access method also implements mechanisms for spatial reuse of the frequency bands.

The invention applies notably within the framework of the following limitations:

The number of available frequency bands is greater than or equal to the number of network participants.

There is no spatial reuse of the frequency bands.

The invention also makes it possible to lift these limitations and proposes that the potential number of users of the network be increased by reusing the frequency bands on several platforms of the network. So that the sharing of these bands is as effective as possible, an algorithm for dynamically allocating the frequency bands is used with the aim of minimizing the interferences between each platform reusing one and the same frequency band. The allocation of the frequency bands is done on the basis of an established network constructed beforehand by a network construction algorithm. In this way, two nodes which possess a transmission link between them are allotted different reception frequency bands. In the case of the reuse of a frequency band, a check is carried out so that the disturbance level induced by one link on another remains below a predefined threshold. This check thus also eliminates the problem of the "near-far effect".

The reuse of the frequency bands in a mobile network involves frequent changes of band. These changes must be performed without any dead time so as to retain the property of being able to transmit without appreciable latency at any instant. A synchronous frequency changing mechanism, also known by the term "handover", is proposed.

The invention is advantageously applicable in respect of directional antennas which make it possible to obtain appreciable throughputs and ranges. The proposed method exploits the directivity of the antennas to increase the spatial reuse of the frequency bands and thus increase the total throughput in the ad hoc network.

The subject of the invention is a method for multiple access to the radio resources in a mobile ad hoc network comprising a plurality of communicating mobile terminals or nodes having known geographical coordinates, characterized in that it comprises at least the following steps:

a step of constructing the said network making it possible to generate a plurality of active links between at least two active nodes of the said network, an active link being composed of two pairs of channels, assigned respectively to transmission and to reception, each comprising a signaling sub-channel and a communication sub-channel, a link being activated when the degree of relevance of the said link is greater than a given constant, the degree of relevance of the said link being determined at least as a function of criteria regarding distance between the said nodes and/or of criteria regarding priority between the said nodes, each of the said active nodes of the said network comprising a neighborhood table which groups together the set of active nodes of the said network to which it is directly linked by an active link, a step of allocating reception frequency bands to each of the said active nodes of the said network, the said frequency bands being of identical width and spaced apart by a given minimum guard band, the said allocating being performed in the following manner:

if the number of active nodes of the said network is less than or equal to the number of frequency bands available, a different reception frequency band is allocated to each of the said nodes, if the number of active nodes of the said network is strictly greater than the number of frequency bands available, a reuse of the said frequency bands is effected in such a way that the allocation is performed so as to minimize the interferences between two active nodes which have the same reception frequency band, a spreading code allocation step performed by each of the said receiver active nodes of the said network for each of the said neighbor transmitter nodes to which it is directly linked by an active link according to an asynchronous CDMA method, the said neighbor transmitter nodes communicating with the said receiver node in the reception frequency band which has been allocated to it, a power control step performed by each of the said receiver nodes of the said network for each of the said neighbor transmitter nodes to which it is directly linked by an active link, the said power control step implementing a different power regulation loop for each of the said active links emanating from the said receiver node having the function of ensuring that all the signals received by the said receiver node originating from the said transmitter nodes are so with the same power level.

In a variant embodiment of the invention, the same reception frequency band is allocated to a plurality of distinct active nodes if and only if the disturbance level induced by an active link of one of the said nodes on an active link of another of the said nodes is below a given threshold.

In a variant embodiment of the invention, a change of reception frequency band of a node of the said network is performed during transmission and this change is announced to the other nodes of the said network with the aid of announcement messages containing at least the instant of the change and the new frequency band.

In a variant embodiment of the invention, each of the said nodes keeps up to date a geographical database comprising its geographical coordinates as well as that of the nodes of its neighborhood table, the said geographical coordinates being provided by a mechanism external to the said network such as a long-range omnidirectional waveform, a tactical data link or a radar system.

In a variant embodiment of the invention, each of the said nodes keeps up to date a geographical database comprising its geographical coordinates as well as that of the nodes of its neighborhood table, the said base being constructed and maintained with the aid of signaling messages dedicated for this purpose and transmitted between the nodes of the said network.

In a variant embodiment of the invention, access to the radio resources of a new node entering the said network is carried out with the aid at least of the following steps:

the said entering node randomly selects a reception frequency band from among those available, the said entering node transmits at least one network entry message in each of the frequency bands available with a transmit power whose level increases progressively until a response is obtained, the said entry message containing at least the geographical position of the said entering node, its speed, its acceleration and its reception frequency band, on receipt of a network entry message, an addressee node updates at least its geographical database and its neighborhood table and responds through a response message transmitted in the reception frequency band contained in the said network entry message with a transmit power calculated at least as a function of the distance between the said entering node and the said addressee node, the said response message containing at least the geographical position of the said addressee node, its speed, its acceleration and its reception frequency band, on receipt of a response message, the said node entering the network updates at least its geographical database and its neighborhood table.

In a variant embodiment of the invention, the dispatching of the said network entry and response messages is done under access contention, using a single spreading code known to all the nodes of the network.

The subject of the invention is also a communication system onboard a mobile node communicating within a mobile ad hoc network, characterized in that it comprises at least one three-dimensional geographical database and a processor suitable for implementing the steps of the above-defined method for multiple access to radio resources.

The subject of the invention is also a mobile ad hoc network comprising a plurality of mobile nodes, characterized in that the said nodes carry onboard such a communication system for multiple access to the radio resources within the said network.

In a variant embodiment of the invention, the said mobile nodes are aircraft.

BRIEF DESCRIPTION OF THE DRAWINGS

Other characteristics will become apparent on reading the detailed description given by way of nonlimiting example which follows, offered in relation to appended drawings which represent.

DETAILED DESCRIPTION

Figure 1:
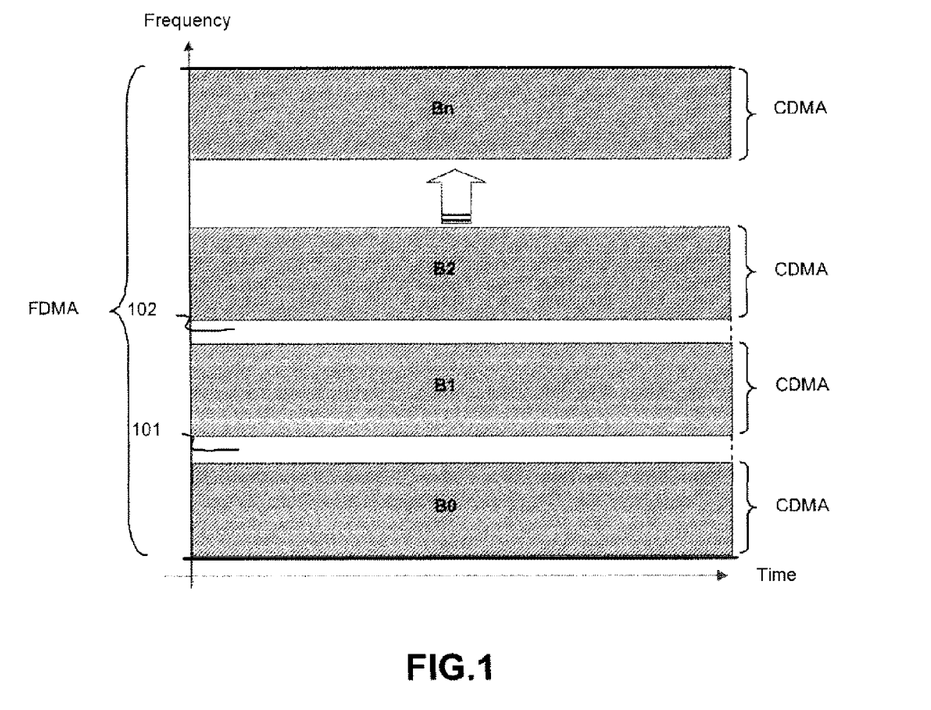
FIG. 1, a diagram illustrating the general principle of the access method according to the invention, FIG. 2, a functional schematic of a system comprising two nodes and implementing the access method according to the invention, FIG. 3, a diagram illustrating the connectivity between several nodes of a network for which the invention applies, FIG. 4, an exemplary meshed network implementing the method according to the invention, FIGS. 5 and 6, two diagrams illustrating the management of a dynamic frequency allocation change, FIG. 7, a diagram illustrating the power control implemented with two different types of antennas.

FIG. 1 illustrates on a time/frequency chart the principle of the multiple access method according to the invention. The invention uses a given number of identical width frequency bands B0, B1, B2, Bn spaced apart at the minimum by a guard band $\delta B$ 101,102 of determined width so as to ensure an acceptable inter-band interference level, that is to say below a given interference threshold. Inside each of these bands B0, B1, B2, Bn, the communication is organized dynamically using an asynchronous code division multiple access (CDMA) method. The codes used, for example codes of Gold or Kasami type known to those skilled in the art, are constructed on the basis of pseudo-random sequences and possess a good mutual orthogonality coefficient whatever the temporal offset between the various transmissions.

Each node of the network is allotted one of these frequency bands B0, B1, B2, Bn that it subsequently uses solely for reception. It is this receiver node which subsequently manages access to the radio resources of all the other nodes which communicate with it on the allocated frequency. Notably this receiver node manages the allocation of codes and throughputs for the nodes which transmit to it, and it also manages the power control loops.

The frequency bands B0, B1, B2, Bn, may be reused by several nodes under the following conditions:

The codes used by these nodes possess a good orthogonality coefficient,

The power level of a code received by a node which is not the addressee of the communication must not exceed a given threshold.

The duplexing used is frequency-only duplexing. For a given node, transmission is possible only outside of the frequency band allocated for reception. This gives rise to constraints on the possibilities of direct communication. Moreover, in the case of frequency reuse, several nodes possessing the same reception band may be prompted to establish a link between themselves. Two solutions are then possible. The first consists in establishing an indirect communication between these nodes by way of a routing via third-party nodes. The second consists in establishing a direct communication by reallocating new frequency bands on the basis of the links of the established network.

Figure 2:
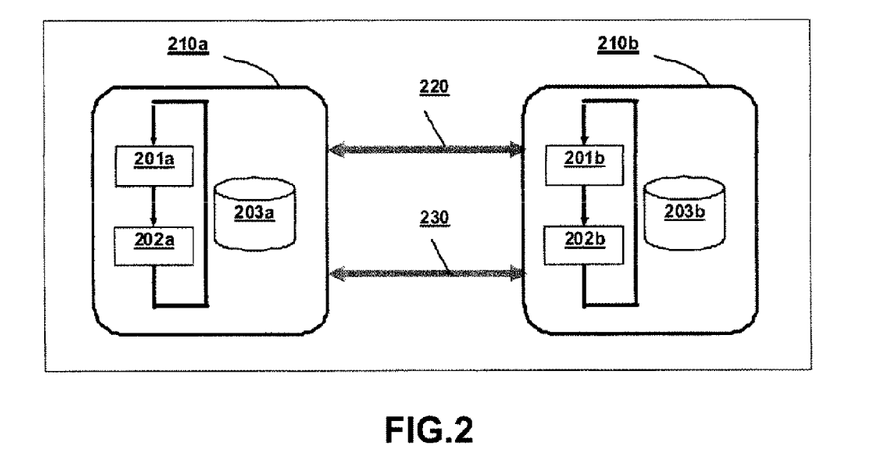

FIG. 2 depicts functionally the elements necessary for the implementation of the access method according to the invention.

A first mobile node 210a of the network, which may be an aircraft in the case of an aeronautical network or any other mobile terminal capable of communicating with a third party, communicates with a second mobile node 210b through a traffic link 230 whose function is the exchanging of useful data and a signaling link 220 whose function is the exchanging of messages allowing overall management of the network. Each of these nodes 210a, 210b comprises a processor which executes, continuously, a method 201a, 201b for constructing the network according to the invention which provides information on the state of the network to a method 202a, 202b for allocating frequencies according to the invention. These two methods are continually fed by a three-dimensional geographical database 203a, 203b which updates and delivers, continuously, the geographical position, the speed vector and acceleration vector of the set of neighbor nodes. The knowledge of these temporal spatial parameters at an instant t makes it possible to estimate the position of the neighbor nodes at an instant t'>t. The 3D geographical database 203a, 203b is fed periodically with a given minimum period. This feed may be performed in various ways. Signaling messages 220 may be dedicated for this purpose to thus support the mechanisms for managing the base 203a, 203b in an autonomous manner. The geographical coordinates of the nodes can also be viewed as input data provided by external mechanisms such as a long-range omnidirectional link, a tactical data link or else the radar system of an airplane.

Figure 3:
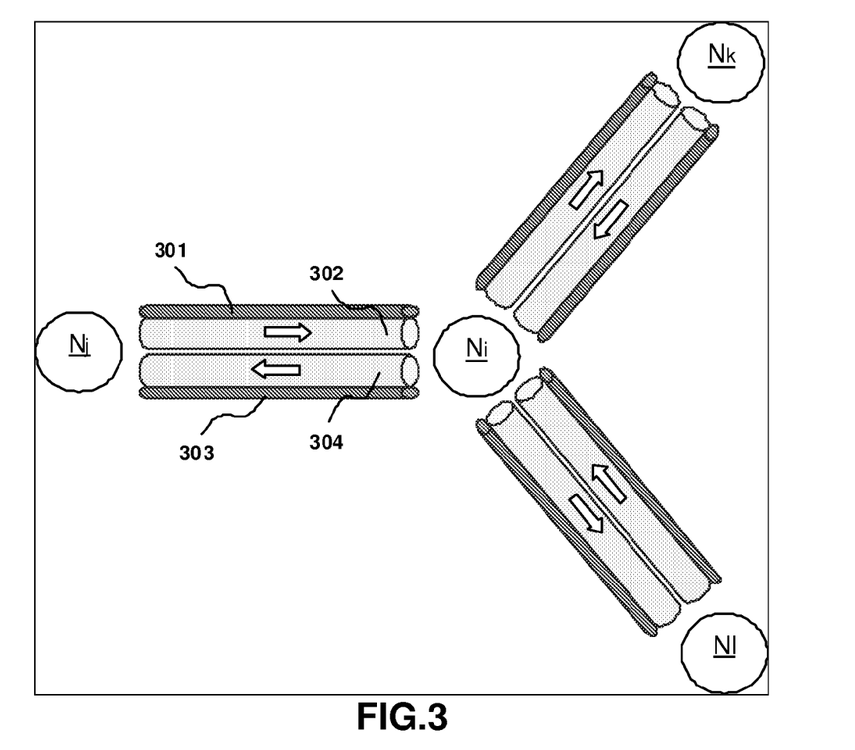

FIG. 3 illustrates the network construction mechanism implementing the access method according to the invention. Each node Ni, Nj, Nk, Nl executes a distributed network construction algorithm. This algorithm is responsible for the dynamic management of the communication links between the various nodes of the system. A link between two nodes is always bidirectional and composed of four channels. In each direction (transmit/receive), a traffic channel 302, 304 and a signaling channel 301,303 are used. For each of these channels 301, 302, 303, 304 a spreading code or code based on a PN sequence and a power level are allocated. Any node of the system Ni, Nj, Nk, Nl, has the possibility of establishing a certain number n of communication links, the maximum number of links being specific to each node and being determined as a function of its antennal capabilities and of its reception capabilities in terms of number of codes processed in parallel. The set of links established with the aid of the network construction algorithm, at an instant t, defines the topology of the network. Any node Ni communicates with a subset of nodes Nj, Nk, Nl of the system via its n active links. Optionally, intermediate nodes can ensure the routing function.

The network construction algorithm builds a graph covering all the nodes of the system in radio range. It executes continuously, the connectivity, that is to say the active links between nodes, changing continually. Any link between two nodes of the network whose degree of relevance is greater than a given constant is established. The degree of relevance is calculated as a function of various dynamic and/or static criteria, local and/or received. The various criteria used may be weighted to compute the final calculation of the degree of relevance. The criteria used can also vary from one type of platform to another. The criteria used are for example, but not solely, geographical criteria such as the proximity of two network nodes between which a link may be established. The shorter a link, the more relevant it will be.

A link between two nodes may be defined as compulsory for reasons specific to the system. In this case this link will have a maximum degree of relevance as soon as the nodes are in radio range of one another.

Once the network has been constructed, each node Ni of the system executes a distributed algorithm according to the invention for dynamically allocating the reception frequency bands. The method consists in allocating in a distributed manner the reception frequency bands to the various nodes of the system with the objective of minimizing the interferences related to the reassigning of the frequency bands to various nodes. The method takes account of the mobility/restructuring of the network by dynamically reallocating frequencies with the aim of maintaining the established links.

Two typical cases are distinguished. The first case corresponds to a scenario for which the number of nodes constituting the network is less than the number of available frequency bands. In this case, the frequency allocation does not require any reuse of certain frequency bands, the solution is optimal and may be executed via a distributed algorithm or simply by static configuration.

The second case requires a more elaborate solution. This is the case where the number of nodes is now greater than the number of available frequency bands. In this case the aim of the frequency allocation is to minimize the interferences between two nodes which possess the same reception frequency band. A possible method for this purpose consists in reducing to the known problem in graph theory of the k-coloring of a planar graph. This method consists in assigning a frequency band to each node with the constraint that two neighbor nodes do not have the same frequency band.

Figure 4:
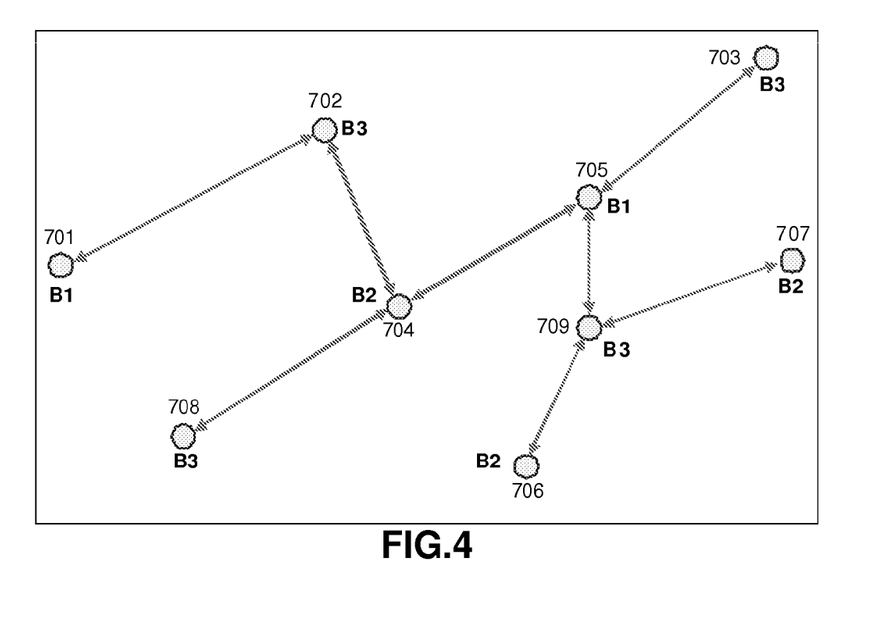

An example of network construction and allocation of frequency bands for reception is illustrated in FIG. 4. Three frequency bands B1, B2, B3 are available and must be allocated to 9 distinct nodes which possess mutually active links defined by a network construction mechanism.

Node 701 receives data from node 702 in frequency band B1.
Node 702 receives data from nodes 701 and 704 in band B3.
Node 703 receives data from node 705 in band B3.
Node 704 receives data from nodes 702,705 and 708 in band B2.
Node 705 receives data from nodes 703,704 and 709 in band B1.
Node 706 receives data from node 709 in band B2.
Node 707 receives data from node 709 in band B2.
Node 708 receives data from node 704 in band B3.
Node 709 receives data from nodes 705,706 and 707 in band B3.

Two neighbor nodes of the network do not have the same reception frequency band so as to limit the level of disturbance. One node is a neighbor of another within the network if they are directly linked by an active link.

The network construction algorithm and frequency band dynamic allocation algorithm define respectively changes, also known in the art as "handovers", of links between nodes and changes of reception frequency band. The changes of links between nodes can occur, for example, when two nodes which have an established link move too far apart, the network construction mechanism then regenerates new links. The changes of reception frequency band occur, for example, when two nodes which communicate reception-wise on the same frequency band approach one another and this may create too appreciable an interference level.

Figure 5:
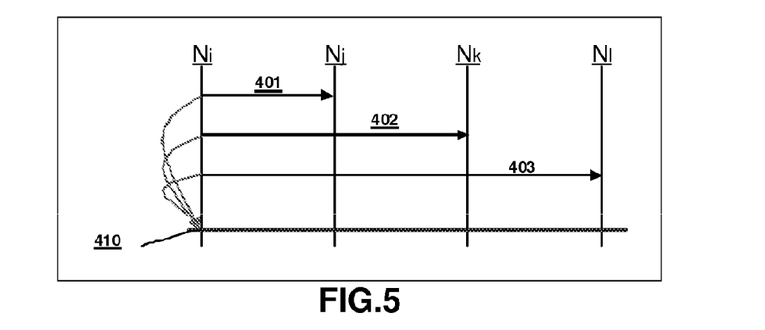

When a change is decided by a given node, this node propagates announcement messages, via its signaling channel, to all the pertinent nodes of the system. The announcement message contains, for example, the date at which the change must take place as well as information such as a new frequency band, a power level or a PN code. FIG. 5 illustrates the dispatching of announcement messages 401, 402, 403 by a node Ni to its neighbors Nj, Nk, Nl announcing the future change 410 of link or of frequency.

Figure 6:
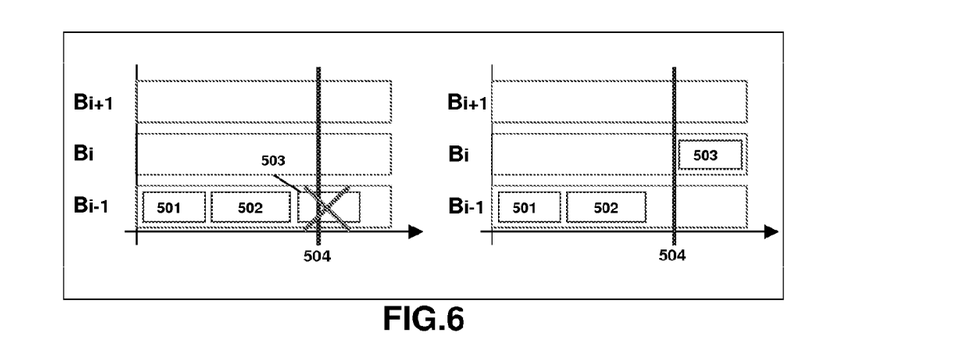

The transmitter nodes must ensure that the transmission of a data packet does not occur during a change of frequency band, such as illustrated in the left part of FIG. 6. A transmission is in progress in the frequency band $B_{i-1}$ for which the data packets 501,502 have already been transmitted, the packet 503 cannot be undergoing transmission when a change 504 from band $B_{i-1}$ to $B_i$ occurs. The right part of FIG. 6 shows that the transmitter node must wait for the change of frequency band 504 of the receiver node before transmitting the data packet 503.

In order not to introduce any latency in the communication, it is possible, in a variant embodiment of the invention, for each node to possess the capacity to receive on two bands $B_{i-1}$, Bi simultaneously during the period of the change. The old link is then broken only when the new one is fully operational.

In mobile communication systems based on a network comprising an infrastructure and implementing a code division multiple access (CDMA) method, such as for example UMTS systems, each node of the network transmits on a single channel only, called the up channel, to a single destination which is called the base station. The latter is tasked with performing the relaying of the messages to more distant nodes. In such a network, each node implements only a single power regulation loop.

In the system according to the invention, conversely, each node of the system can communicate with several addressee nodes, the latter organizing access to the radio resources by code division (CDMA) for reception in different frequency bands and at different distances from the transmitter node. Consequently, any node of the system implements n power regulation loops, n being the number of direct active links which link this node to its neighbors. Indeed, all the signals having one and the same node as destination must be received at a power level closest to the level required, any signal being added to the interferences undergone by the other signals. The function of the power regulation loops implemented by a node is therefore to adapt the transmit powers as a function of the link budget of the active links which connect it to the addressee nodes. The link budget depends notably on the relative distances between each node. The power control loop is all the more reactive the bigger the relative speeds of the nodes so as to remain compatible with a highly mobile network.

Figure 7:
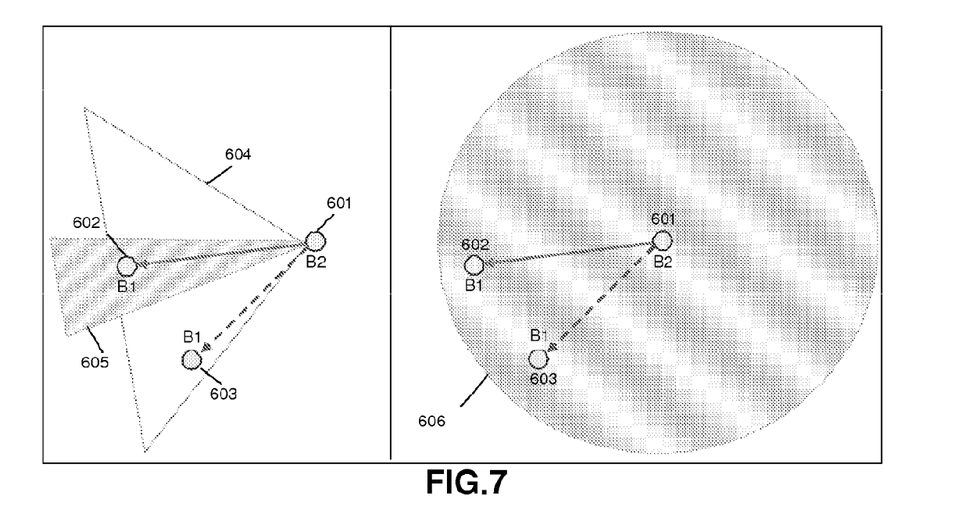

By way of example FIG. 7 illustrates a control loop implemented between two nodes 601 and 602 in a frequency band for reception equal to B1. It also shows the interferences induced by node 601 on node 603 which also uses the frequency band B1 for reception in the same way as node 602. Nodes 602 and 603 are situated at equal distances from the transmitter node 601. The left part of FIG. 7 shows the case where a directional antenna is used by the transmitter node 601, in this case the transmitted signal 605 destined for node 602 is more weakly received 604 by the neighbor node 603. On the other hand in the case where an omnidirectional antenna is used by the transmitter node 601, as is illustrated in the right part of FIG. 7, the transmitted signal 606 is received with the same amplitude by the addressee node 602 and the neighbor node 603.

A particular case of the invention occurs in the case where the 3D geographical database is updated by way of signaling messages and when a mobile terminal makes its entry into the network which has been previously established. A network entry protocol must therefore be implemented. This protocol is based on the use of network entry messages. These messages are dispatched under access contention, by using a unique code known and decoded by all. The terminal entering the network randomly selects a reception frequency band, from among those available, that it will be able to alter over time until at least one response originating from another node is obtained. It transmits network entry messages in each of the frequency bands of the system so as to have a chance of reaching at least one neighbor node. For the nodes using directional antennas, the dispatching of network entry messages is done successively in various sectors of space so as to obtain omnidirectional coverage. In order not to dazzle any near nodes that might be receiving on the frequency band of a network entry message, these messages are dispatched by firstly using a reduced power which keeps increasing until a response is obtained. Any network entry message contains at the minimum the geographical position of the transmitter node, its speed vector and acceleration vector as well as its reception frequency band. On receipt of a network entry message, the addressee node updates its data structures, including its 3D geographical database and its neighborhood table.

Any node having received a network entry message responds through a response message which is transmitted in the frequency band defined in the network entry message. The response message transmit power is calculated as a function of the distance of the source node and addressee node and of the power level required for the reception of this type of message. The distance between the two nodes is calculated as a function of the geographical information of the node transmitting the response message and of the information received in the input network entry message. This information is extracted from the 3D geographical database. The response message contains the geographical positions, the speed vector and acceleration vector as well as the reception frequency band of the nodes which are known to the transmitter node. On receipt of the response message, the addressee node updates its various data structures, including its 3D geographical database and its neighborhood table.

The invention has the advantage, by virtue of the proposed multiple access method, of allowing optimal allocation of resources in terms of latency times and of available passband between the various users of a mobile ad hoc network. The latency of a point-to-point transmission between two nodes of the network is reduced since access to the spectral resource by a user is not constrained over time in contradistinction to time division multiple access techniques.

Moreover the invention also presents the advantage of coupling two functions, namely a multiple access method and a discretion method by using the same mechanism, thereby making it possible to redistribute the capacity which is unused in the case of discretion, that is to say of reduced power, to the other users. Indeed, the signal transmitted by a terminal may be rendered discreet by decreasing the transmit power and by increasing the spreading factor which is a parameter of the CDMA access method. By way of example, a spreading factor equal to 10 entails the coding of a useful bit by 10 chips (or "slots") of the spreading code used. The total energy radiated is distributed over the useful frequency band and the power density per Hertz of the transmitted signal is 10 times lower before the despreading operation on reception. The spread signal is therefore more difficult for a third party to detect. Each platform can decide its degree of discretion independently of the others, the drop in capacity brought about by an increased requirement for discretion being redistributed to the other users sharing the same frequency band.

The invention also makes it possible to dynamically manage the allocation of the frequency bands allocated to reception for each node of the network as a function of the spatial evolution of this network. In particular when two terminals operating at the same reception frequency approach one another, a reallocation of the frequency plan is implemented.

The invention claimed is:
1. A method for multiple access to the radio resources in a mobile ad hoc network comprising a plurality of communicating mobile terminals or nodes, having known geographical coordinates, the method comprising:
constructing said network making it possible to generate a plurality of active links between at least two active nodes of said network, an active link being composed of two pairs of channels, assigned respectively to transmission and to reception, each comprising a signaling sub-channel and a communication sub-channel, a link being activated according to a degree of relevance, the degree of relevance being determined at least as a function of criteria regarding distance between said nodes and/or of criteria regarding priority between said nodes, each of said active nodes of said network comprising a neighborhood table which groups together the set of active nodes of said network to which it is directly linked by an active link;
allocating reception frequency bands to each of said active nodes of said network, said frequency bands being of identical width and spaced apart by a given minimum guard band, said allocating being performed in the following manner:

if the number of active nodes of said network is less than or equal to the number of frequency bands available, a different reception frequency band is allocated to each of said nodes; and     if the number of active nodes of said network is strictly greater than the number of frequency bands available, a reuse of said frequency bands is effected in such a way that the allocation is performed so as to minimize the interferences between two active nodes which have the same reception frequency band;

performing spreading code allocation by each of said receiver active nodes of said network for each of said neighbor transmitter nodes to which it is directly linked by an active link according to an asynchronous CDMA method, said neighbor transmitter nodes communicating with said receiver node in the reception frequency band which has been allocated to it; and performing power control by each of said receiver nodes of said network for each of said neighbor transmitter nodes to which it is directly linked by an active link, said power control step implementing a different power regulation loop for each of said active links emanating from said receiver node having the function of ensuring that all the signals received by said receiver node originating from said transmitter nodes are so with the same power level.

2. The multiple access method according to claim 1, wherein the same reception frequency band is allocated to a plurality of distinct active nodes if and only if the disturbance level induced by an active link of one of said nodes on an active link of another of said nodes is below a given threshold.

3. The multiple access method according to claim 1, wherein a change of reception frequency band of a node of said network is performed during transmission and that this change is announced to the other nodes of said network with the aid of announcement messages containing at least the instant of the change and the new frequency band.

4. The multiple access method according to claim 1, wherein each of said nodes keeps up to date a geographical database comprising its geographical coordinates as well as that of the nodes of its neighborhood table, said geographical coordinates being provided by a mechanism external to said network such as a long-range omnidirectional waveform, a tactical data link or a radar system.

5. The multiple access method according to claim 1, wherein each of said nodes keeps up to date a geographical database comprising its geographical coordinates as well as that of the nodes of its neighborhood table, the said base being constructed and maintained with the aid of signaling messages dedicated for this purpose and transmitted between the nodes of said network.

6. The multiple access method according to claim 5, wherein access to the radio resources of a new node entering said network is carried out with the aid of at least of the following steps:

said entering node randomly selects a reception frequency band from among those available;

said entering node transmits at least one network entry message in each of the frequency bands available with a transmit power whose level increases progressively until a response is obtained, said entry message containing at least the geographical position of said entering node, its speed, its acceleration and its reception frequency band;

on receipt of a network entry message, an addressee node updates at least its geographical database and its neighborhood table and responds through a response message transmitted in the reception frequency band contained in said network entry message with a transmit power calculated at least as a function of the distance between said entering node and said addressee node, said response message containing at least the geographical position of the said addressee node, its speed, its acceleration and its reception frequency band; and     on receipt of a response message, said node entering the network updates at least its geographical database and its neighborhood table.

7. The multiple access method according to claim 6, wherein the dispatching of said network entry and response messages is done under access contention, using a single spreading code known to all the nodes of the network.

8. A method for multiple access to the radio resources in a mobile ad hoc network comprising a plurality of communicating mobile nodes $N_i$, $N_j$, $N_k$, $N_l$, said method comprising at least the following steps:

generating a plurality of active links between at least two active nodes $N_i$, $N_j$, $N_k$, $N_l$ of said network, an active link being composed of two pairs of channels, assigned respectively to transmission and to reception, each pair comprising a signalling channel and a communication channel, an active link being generated according to a degree of relevance determined at least as a function of criteria regarding distance between said nodes and/or priority between said nodes,     allocating reception frequency bands $B_0$, $B_1$, $B_2$, $B_n$ to each of the active nodes of the network, said frequency bands $B_0$, $B_1$, $B_2$, $B_n$ being of substantially identical width and spaced apart by a given minimum guard band $\delta B$, said allocating being performed in the following manner:

if the number of active nodes in the network is less than or equal to the number of frequency bands $B_0$, $B_1$, $B_2$, $B_n$ available, a different reception frequency band is allocated to each of said active nodes,         if the number of active nodes in the network is strictly greater than the number of frequency bands $B_0$, $B_1$, $B_2$, $B_n$ available, a reuse of the frequency bands is done in such a way as to minimize the interferences between two active nodes which have been allocated the same reception frequency band,     a spreading code allocation step performed by each of the receiver active nodes $N_i$ of the network for each of the neighbour transmitter nodes $N_j$, $N_k$, $N_l$ to which it is directly linked by an active link, according to an asynchronous CDMA method, said neighbour transmitter nodes $N_j$, $N_k$, $N_l$ communicating with said receiver node $N_i$ in the reception frequency band $B_i$ which has been allocated to said receiver node $N_i$.

9. A communication system onboard a mobile node communicating within a mobile ad hoc network comprising a plurality of communicating mobile nodes $N_i$, $N_j$, $N_k$, $N_l$, said communication system comprising:

a processor generating a plurality of active links between at least two active nodes $N_i$, $N_j$, $N_k$, $N_l$ of said network, an active link being composed of two pairs of channels, assigned respectively to transmission and to reception, each pair comprising a signalling channel and a communication channel, an active link being generated according to a degree of relevance determined at least as a function of criteria regarding distance between said nodes and/or priority between said nodes,     the processor allocating reception frequency bands $B_0$, $B_1$, $B_2$, $B_n$ to each of the active nodes of the network, said frequency bands B0, B1, B2, Bn being of substantially identical width and spaced apart by a given minimum guard band δB, said allocating being performed in the following manner:
  if the number of active nodes in the network is less than or equal to the number of frequency bands B0, B1, B2, Bn available, a different reception frequency band is allocated to each of said active nodes,
  if the number of active nodes in the network is strictly greater than the number of frequency bands B0, B1, B2, Bn available, a reuse of the frequency bands is effected in such a way as to minimize the interferences between two active nodes which have been allocated the same reception frequency band,
the processor allocating a spreading code from each of the receiver active nodes Ni of the network to each of the neighbour transmitter nodes Nj, Nk, Nl to which it is directly linked by an active link, according to an asynchronous CDMA method, said neighbour transmitter nodes Nj, Nk, Nl communicating with said receiver node Ni in the reception frequency band Bi which has been allocated to said receiver node Ni.

10. The communication system according to claim 9 wherein the processor allocates the same reception frequency band to a plurality of distinct active nodes if and only if the disturbance level induced by an active link of one of said nodes on an active link of another of said nodes is below a given threshold.

11. The communication system according to claim 9 wherein the processor performs a change of reception frequency band of a node of the network during transmission and announces this change to the other nodes of the network with the aid of announcement messages containing at least the instant of the change and the new frequency band.

12. The communication system according to claim 9 wherein said processor implements a power control step performed by each of the receiver nodes Ni of the network for each of the neighbour transmitter nodes Nj, Nk, Nl to which it is directly linked by an active link, said power control step implementing a different power regulation loop for each of the active links emanating from said receiver node Ni having the function of ensuring that all the signals received by said receiver node Ni originating from said transmitter nodes Nj, Nk, Nl are so with the same power level.

13. The communication system according to claim 9 wherein said processor is also configured to generate in each of said active nodes Ni, a neighbourhood table comprising the set of active nodes Nj, Nk, Nl to which it is directly linked by an active link.

14. The communication system according to claim 13 also comprising a three-dimensional geographical database kept up to date for each of the nodes, said geographical database comprising its geographical coordinates of a node as well as that of the nodes of the neighbourhood table of a node, said geographical coordinates being provided by a mechanism external to the network such as a long-range omnidirectional waveform, a tactical data link or a radar system.

15. The communication system according to claim 13 also comprising a three-dimensional geographical database kept up to date for each of the nodes, said geographical database comprising geographical coordinates of a node as well as that of the nodes of the neighbourhood table of a node, said database being constructed and maintained with the aid of signalling messages dedicated for this purpose and transmitted between the nodes of the network.

16. A mobile ad hoc network comprising a plurality of mobile nodes, each comprising a communication system onboard a mobile node communicating within a mobile ad hoc network comprising a plurality of communicating mobile nodes Ni, Nj, Nk, Nl, said communication system comprising:
  a processor generating a plurality of active links between at least two active nodes Ni, Nj, Nk, Nl of said network, an active link being composed of two pairs of channels, assigned respectively to transmission and to reception, each pair comprising a signalling channel and a communication channel, an active link being generated according to a degree of relevance determined at least as a function of criteria regarding distance between said nodes and/or priority between said nodes,
  the processor allocating reception frequency bands B0, B1, B2, Bn to each of the active nodes of the network, said frequency bands B0, B1, B2, Bn being of substantially identical width and spaced apart by a given minimum guard band δB, said allocating being performed in the following manner:
    if the number of active nodes in the network is less than or equal to the number of frequency bands B0, B1, B2, Bn available, a different reception frequency band is allocated to each of said active nodes,
    if the number of active nodes in the network is strictly greater than the number of frequency bands B0, B1, B2, Bn available, a reuse of the frequency bands is effected in such a way as to minimize the interferences between two active nodes which have been allocated the same reception frequency band,
  the processor allocating a spreading code from each of the receiver active nodes Ni of the network to each of the neighbour transmitter nodes Nj, Nk, Nl to which it is directly linked by an active link, according to an asynchronous CDMA method, said neighbour transmitter nodes Nj, Nk, Nl communicating with said receiver node Ni in the reception frequency band Bi which has been allocated to said receiver node Ni.

17. A mobile ad hoc network comprising a plurality of mobile nodes, each comprising a communication system onboard a mobile node communicating within a mobile ad hoc network comprising a plurality of communicating mobile nodes Ni, Nj, Nk, Nl, said communication system comprising:
  a processor generating a plurality of active links between at least two active nodes Ni, Nj, Nk, Nl of said network, an active link being composed of two pairs of channels, assigned respectively to transmission and to reception, each pair comprising a signalling channel and a communication channel, an active link being generated according to a degree of relevance determined at least as a function of criteria regarding distance between said nodes and/or priority between said nodes,
  the processor allocating reception frequency bands B0, B1, B2, Bn to each of the active nodes of the network, said frequency bands B0, B1, B2, Bn being of substantially identical width and spaced apart by a given minimum guard band δB, said allocating being performed in the following manner:
    if the number of active nodes in the network is less than or equal to the number of frequency bands B0, B1, B2, Bn available, a different reception frequency band is allocated to each of said active nodes,
    if the number of active nodes in the network is strictly greater than the number of frequency bands B0, B1, B2, Bn available, a reuse of the frequency bands is effected in such a way as to minimize the interferences between two active nodes which have been allocated the same reception frequency band, the processor allocating a spreading code from each of the receiver active nodes Ni of the network to each of the neighbour transmitter nodes Nj, Nk, Nl to which it is directly linked by an active link, according to an asynchronous CDMA method, said neighbour transmitter nodes Nj, Nk, Nl communicating with said receiver node Ni in the reception frequency band Bi which has been allocated to said receiver node Ni, wherein the mobile nodes are aircrafts.

* * * * *